April 24, 1934.　　　　J. COYLE　　　　1,956,345
SOLDER APPLYING MEANS
Filed July 26, 1932　　　3 Sheets-Sheet 3
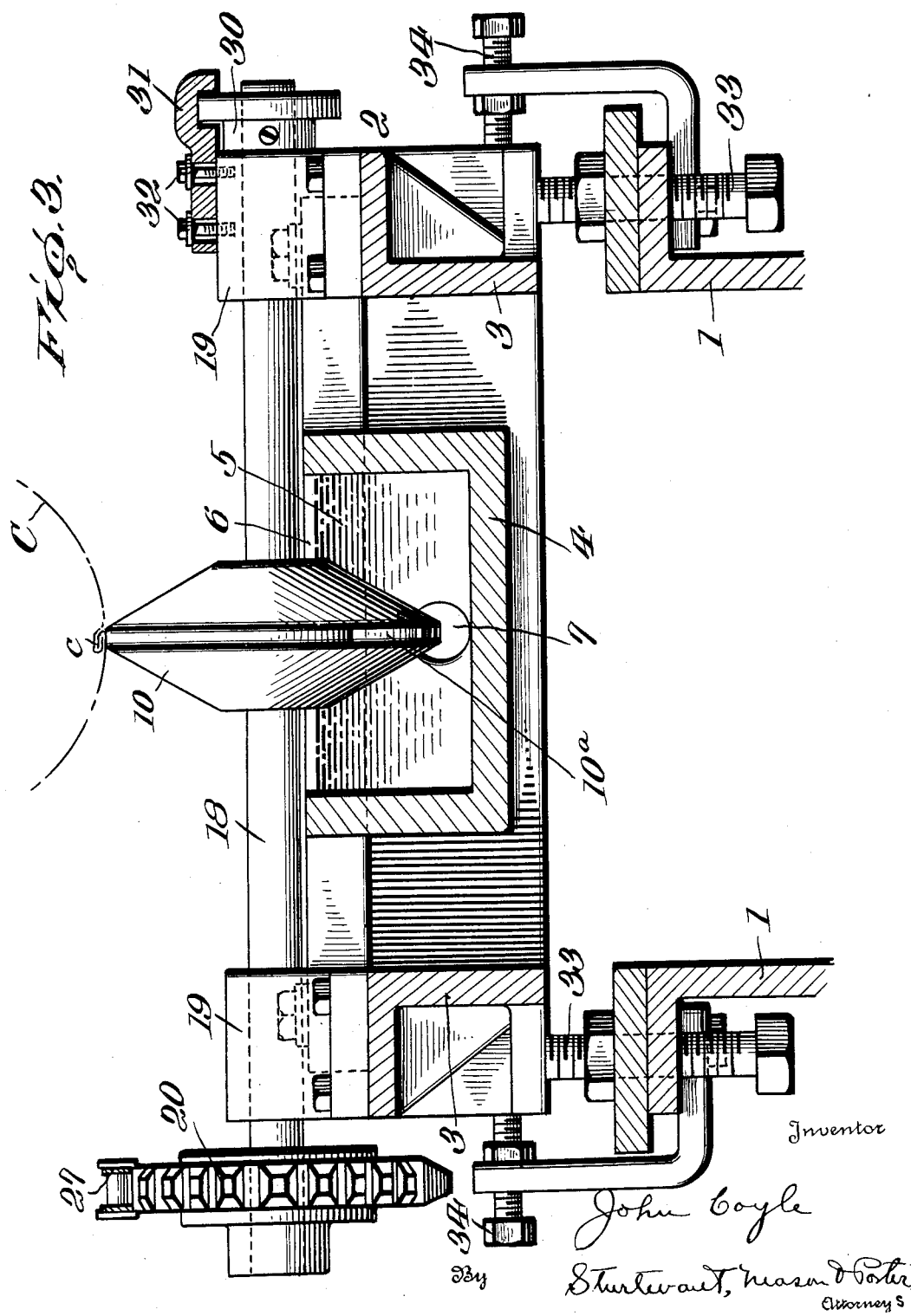

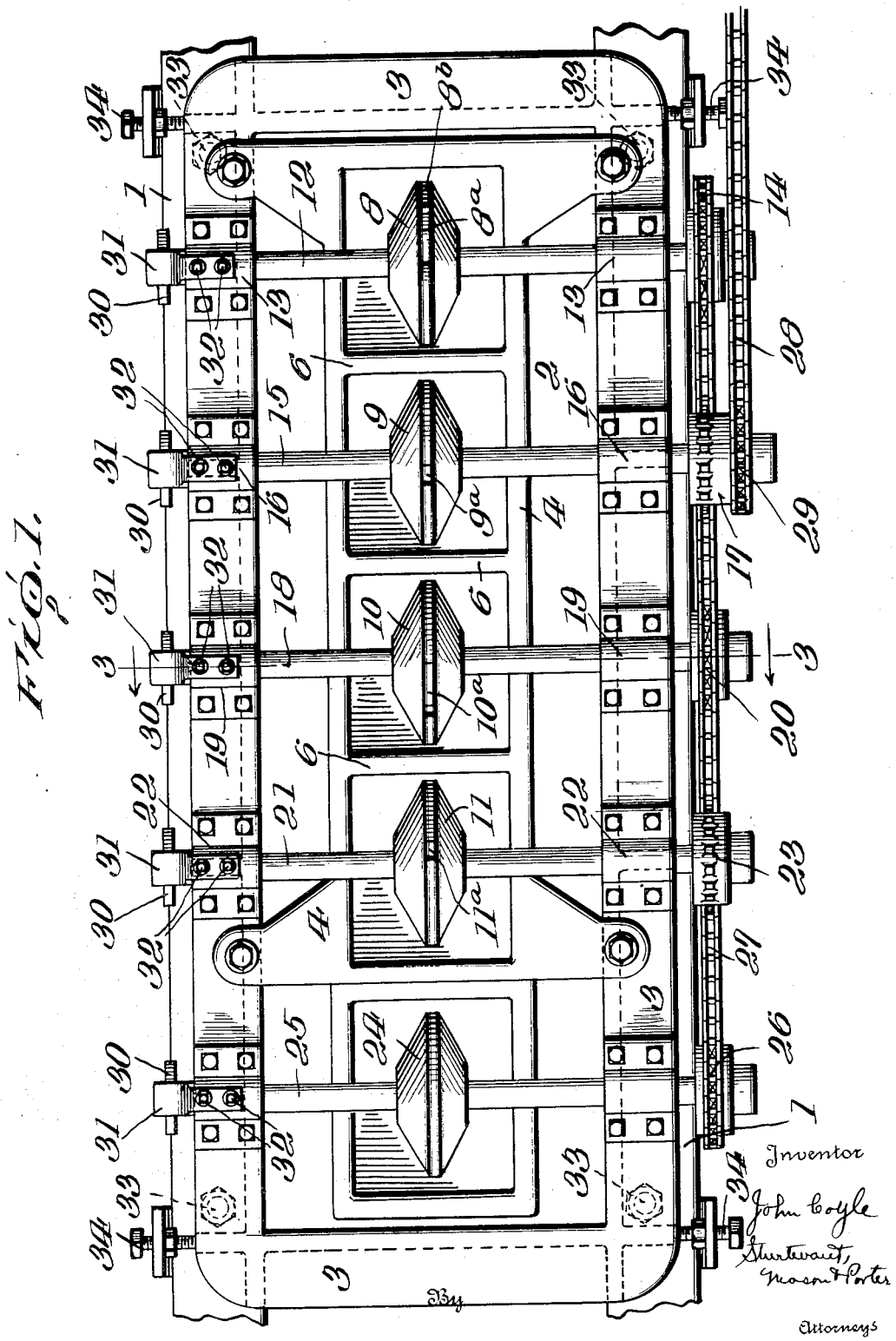

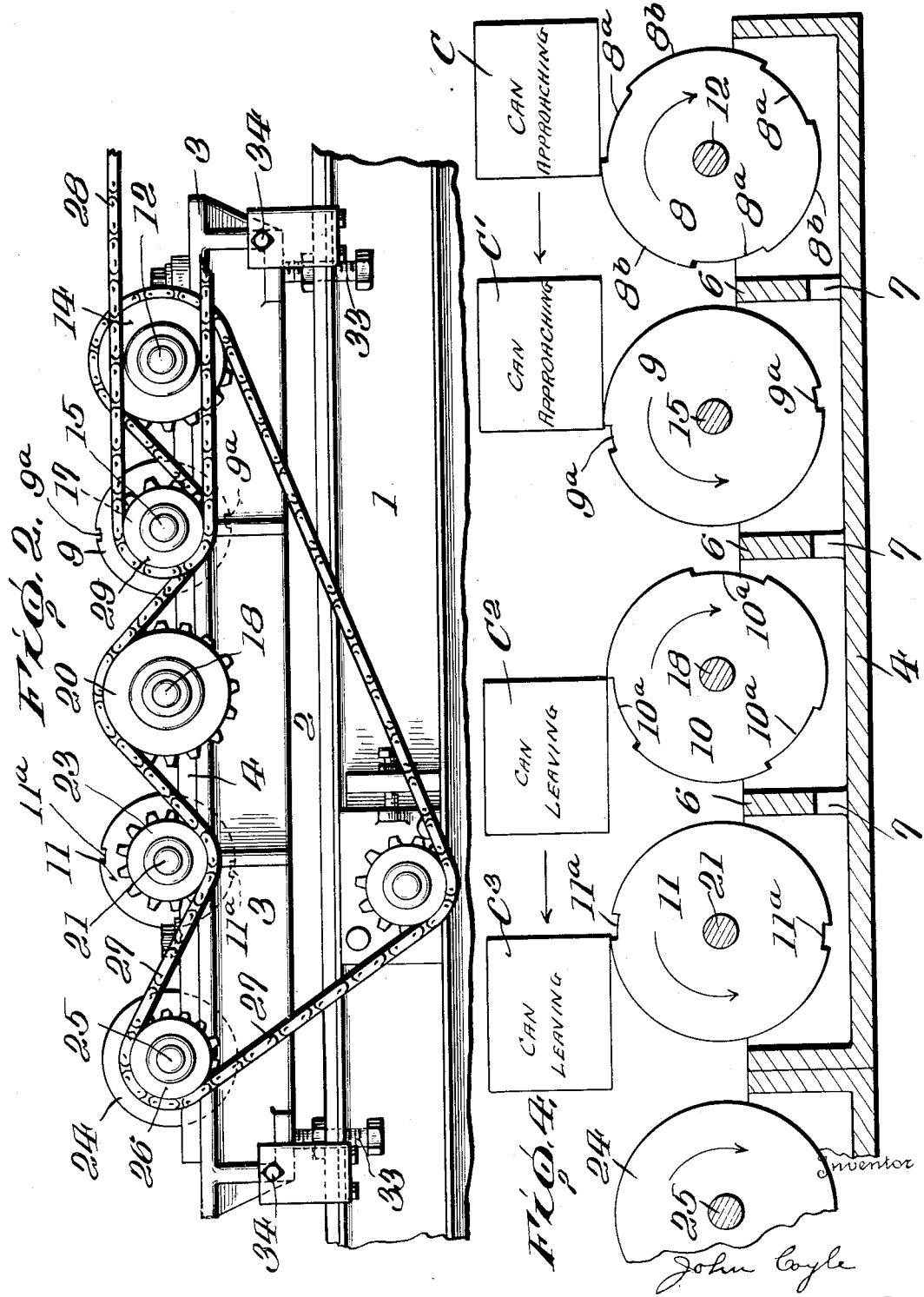

Patented Apr. 24, 1934

1,956,345

UNITED STATES PATENT OFFICE 1,956,345

SOLDER APPLYING MEANS

John Coyle, Baltimore, Md., assignor to Continental Can Company, Inc., New York, N. Y., a corporation of New York Application July 26, 1932, Serial No. 624,868

4 Claims. (Cl. 113—61)

The invention relates to new and useful improvements in a solder applying means, and more particularly to a means for applying solder to the side seam of a can body.

An object of the invention is to provide a solder applying means whereby solder from a molten bath may be applied to the outer face of the side seam without applying any solder within the container body.

A further object of the invention is to provide a solder applying means in the form of rotating disks arranged in tandem, which disks are so constructed as to contact with the outer face of the side seam and apply solder thereto without applying any solder to the inside of the can body.

A still further object of the invention is to provide a solder applying means comprising rotating disks arranged in tandem, with a means for operating the same whereby alternate disks may be rotated in opposite directions.

These and other objects will in part be obvious and will in part be hereinafter more fully disclosed.

In the drawings, which show by way of illustration one embodiment of the invention:

Figure 1 is a plan view of a solder bath having the improved solder applying devices applied thereto.

Figure 2 is a side view of a portion of the machine showing the driving means for the solder disks.

Figure 3 is a sectional view on the line 3—3 of Figure 1.

Figure 4 is a diagrammatic view showing the solder applying disks and the timing of the can bodies relative to the travel of the disks.

The improved solder applying means comprises a solder bath which includes a tank containing molten solder. The tank is preferably divided by transverse partitions into sections, and in each section is mounted for rotation a solder applying disk. Each solder applying disk is provided with notches or recesses in the peripheral surface thereof, and the disks are so timed and dimensioned relative to the can bodies to be soldered that when the end of a can body approaches the disk, a notch or recess will be in register with the advancing end of the side seam so that the solder applying disk will first contact with the outer face of the side seam at a distance back from the edge thereof. The solder disks are arranged in tandem and contact with the can bodies in succession. Alternate disks are preferably rotated in opposite directions and the disk traveling with the can body is moved at a faster speed than the disk traveling in a direction opposed to that of the can body. The disks traveling with the can bodies have their notches or recesses so disposed and are so dimensioned that the notch or recess is in register with the rear end of the side seam as it leaves the disk, so that no solder will be thrown or scraped by the end of the side seam into the can body.

It is thought that the invention will be better understood by a detailed description of the illustrated embodiment thereof.

The soldering machine includes the usual supporting frame 1 on which the solder applying devices indicated as a whole at 2 in the drawings are mounted. The solder applying devices include an auxiliary supporting frame 3 on which is mounted a tank 4. Suitable heating means is placed beneath the tank for heating the solder therein and maintaining the same in a molten condition. The solder is indicated in Figure 3 of the drawings at 5. Extending across the tank are transverse partitions 6 dividing the tank into sections, and through each partition is an opening 7 so as to allow circulation of the molten solder from one section to another, thus maintaining an even level of the solder in the tank. These partitions prevent the forcing of the solder toward the rear end of the tank by the rotation of the solder applying devices in the molten solder.

As shown in the drawings, there are four solder applying disks which are numbered 8, 9, 10 and 11 respectively. The disk 8 is carried by a shaft 12 mounted in bearings 13, 13 carried by the auxiliary supporting frame 3. Attached to this shaft 12 is a sprocket wheel 14. The disk 9 is carried on a similar shaft 15 mounted in bearings 16, 16 and carrying a sprocket wheel 17. The disk 10 is carried by the shaft 18 which in turn is mounted in bearings 19, 19 and this shaft 18 carries a sprocket wheel 20. The disk 11 is carried by shaft 21, rotating in bearings 22, 22 and carrying sprocket wheel 23. There is a rotating disk 24 carried by a shaft 25 which rotates in the molten solder and serves as a means for distributing the solder and taking up surplus solder. The shaft 25 carries a sprocket wheel 26. A sprocket chain 27 runs over the sprocket wheels 14, 17, 23 and 26. It will be noted from Figure 1 that the sprocket chain passes over sprocket wheel 14, underneath the sprocket wheel 17, over the sprocket wheel 20, then underneath the sprocket wheel 23 and over the sprocket wheel 26. Therefore, all of the disks 8, 10 and 24 are rotating in a clockwise direction. The disks 9 and 11 rotate in a counterclockwise direction. A driving chain 28 runs over a sprocket wheel 29 on the shaft 15 and this imparts motion to all of the disks.

As clearly shown in Figures 1 and 4, the disks are arranged in tandem, one in rear of the other, and they operate in succession on the can bodies as they pass over the same. The can body is indicated by the broken line at C in Figure 3, and the side seam is indicated at c. It is essential that the solder applying disks shall be in alignment and properly positioned relative to the side seam. Provision is made therefore for a limited movement of the shafts supporting these solder applying disks in an endwise direction. Each shaft carries a collar 30 which is fixed to the outer end thereof, and this collar has a projecting flange running in a recess in a bracket 31 which is secured to the bearing for the shaft by bolts 32, 32. These bolts pass through slots which permit the bracket to be shifted in a direction endwise of the shaft, and thus the shaft shifted in its bearings and the solder applying disks lined up with each other or shifted laterally of the bath in which they operate. The auxiliary supporting frame 3 for the solder bath is mounted on adjustable bolts 33, 33, and adjustable bolts 34, 34 determine the lateral position of the auxiliary frame. This provides means for raising and lowering the solder applying devices and also for the lateral shifting of the same.

The solder applying disk 8 is provided with three notches or recesses 8a formed in the periphery of the disk. The can body indicated at C in Figure 4 is moving in the direction of the arrow and is timed so that the advance end of the side seam registers with this notch 8a, and the extreme end 8b of the solder applying segment between the notches contacts with the side seam at a point back from the end of the side seam. This disk as noted is rotating in a direction opposite to the direction of travel of the can body and if it were not for the notch, the can body when it came into contact with the disk would scrape solder onto the inside of the side seam. Solder is applied all the way along the outside of the side seam and inasmuch as the solder disk is rotating in a direction opposed to the direction of travel of the can, no solder will be thrown into the rear end of the can body as it leaves the solder applying disk. The solder applying disk 9 as noted rotates in a counterclockwise direction and is provided with two notches or recesses 9a, 9a. These notches or recesses are so disposed and the disk is so dimensioned that when the can body reaches the position C', the periphery of the disk will contact with the side seam all the way to the advancing end thereof. The disk 11 has notches 11a, and the can body C³ is shown as leaving this disk. At this time the notch 11a is in register with the rear end of the side seam and although the disk is traveling in the same direction as the can body and slightly faster than the can body is moving, still no solder will be thrown or scraped by the end of the side seam into the inside of the can body. The same is true when the can body C' leaves the solder applying disk 9. The can body C² is shown as leaving the disk 10 which has the three notches 10a, and solder is applied all the way to the end of the side seam. As the can body therefore passes over the four disks, solder will be applied all the way from one end of the side seam to the other and at the same time the can never contacts with the solder applying disk so as to scrape solder into the can body.

The disks 8 and 10 have larger sprocket wheels for operating the same than the disks 9 and 11 and therefore they move at a slower speed than the disks 9 and 11. The disks 8 and 10 are traveling in a direction opposite to the direction of travel of the can body and while the disks 9 and 11 are traveling with the can body. This difference in speed results in a uniform time of contact between the can body and the disk applying the solder thereto and the uniform distribution of the solder. The solder disk 24 runs in the solder bath separate from the other solder bath and is supplied with solder so as to tin the peripheral edge thereof. This disk runs in a direction opposed to the travel of the can body and serves to distribute the solder and reclaim surplus solder. It is not intended as a solder applying disk.

While four separate applying disks have been shown, it is understood that a greater number of disks may be used and the shaping and dimensioning of the disks and the notches therein greatly varied without departing from the spirit of the invention as set forth in the appended claims.

Having thus described the invention, what I claim as new and desire to secure by Letters Patent, is:

1. A solder applying means comprising a solder bath, a plurality of solder applying disks arranged in tandem in said solder bath and operating in succession for contacting with the side seam of a can body for applying solder thereto, and means for rotating said disks, said disks having recesses formed in the peripheral surfaces thereof, said recesses being arranged and said disks dimensioned so that solder is applied to the side seam throughout the entire length thereof without the end of the side seam contacting with any solder applying disk so as to scrape solder therefrom onto the interior of the can body.

2. A solder applying means comprising a solder bath, a plurality of solder applying disks arranged in tandem in said solder bath and operating in succession for contacting with the side seam of a can body for applying solder thereto, and means for rotating alternate disks in opposite directions, said disks having recesses formed in the peripheral surfaces thereof, said recesses being arranged and said disks dimensioned so that solder is applied to the side seam throughout the entire length thereof without the end of the side seam contacting with any solder applying disk so as to scrape solder therefrom onto the interior of the can body.

3. A solder applying means comprising a solder bath, a plurality of solder applying disks arranged in tandem in said solder bath and operating in succession for contacting with the side seam of a can body for applying solder thereto, and means for rotating alternate disks in opposite directions so that certain of said disks travel with the can body and others travel in a direction opposed to the travel of the can body, said disks having recesses formed in the peripheral surface thereof, said recesses being arranged and said disks dimensioned so that solder is applied to the side seam throughout the entire length thereof without the end of the side seam contacting with any solder applying disk so as to scrape solder therefrom onto the interior of the can body.

4. A solder applying means comprising a solder bath, a plurality of solder applying disks arranged in tandem in said solder bath and operating in succession for contacting with the side seam of a can body for applying solder thereto, and means for rotating alternate disks in opposite directions so that certain of said disks travel with the can body and others travel in a direction opposed to the travel of the can body, said disks traveling with the can body moving at a greater speed than the disks traveling in the opposite direction, said disks having recesses formed in the peripheral surface thereof, said recesses being arranged and said disks dimensioned so that solder is applied to the side seam throughout the entire length thereof without the end of the side seam contacting with any solder applying disk so as to scrape solder therefrom onto the interior of the can body.

JOHN COYLE.